United States Patent

Uekusa et al.

[15] 3,707,686

[45] Dec. 26, 1972

[54] NON-CONTACT SWITCHING DEVICE INCLUDING OSCILLATOR CONTROLLED BY MOVABLE MAGNETS

[72] Inventors: Genzo Uekusa, Takatsuki; Shigeru Tanimura, Kyoto; Norio Maejima, Kameoka, all of Japan

[73] Assignee: Omron Tateisi Electronics Co., Kyoto, Japan

[22] Filed: Feb. 23, 1971

[21] Appl. No.: 117,913

[30] Foreign Application Priority Data

Feb. 23, 1970 Japan ................................45/15676

[52] U.S. Cl..................331/65, 307/116, 331/117 R, 331/181, 340/258 C, 340/282

[51] Int. Cl........H03b 3/00, H03b 5/12, H01h 36/00

[58] Field of Search........331/65, 116 M, 117 R, 181; 307/116, 125; 328/5; 340/258 C, 282

[56] References Cited

UNITED STATES PATENTS

| | | | |
|---|---|---|---|
| 3,594,624 | 7/1971 | Lueder | 331/65 X |
| 2,907,991 | 10/1959 | Van Allen | 331/65 X |
| 3,524,177 | 8/1970 | Ohno | 331/117 X |

*Primary Examiner*—Roy Lake
*Assistant Examiner*—Siegfried H. Grimm
*Attorney*—Craig, Antonelli, Stewart & Hill

[57] ABSTRACT

Non-contact switching is attainable with a non-contact switching device which comprises movable permanent magnets, inductors having at least one coil wound around a magnetic core of ferro-magnetic or ferri-magnetic material magnetically coupled with said permanent magnet, and an oscillating circuit including said inductor as its resonance inductor.

14 Claims, 3 Drawing Figures

PATENTED DEC 26 1972 3,707,686

INVENTORS: GENZO UEKUSA, SHIGERU TANIMURA, NORIO MAEJIMA

BY Craig, Antonelli, Stewart & Hill
ATTORNEYS

NON-CONTACT SWITCHING DEVICE INCLUDING OSCILLATOR CONTROLLED BY MOVABLE MAGNETS

BACKGROUND OF THE INVENTION

This invention relates to a novel non-contact switching device utilizing a novel magneto-electric phenomenon observed in an inductor under the influence of a permanent magnet.

Hitherto, sealed reed-contact type switches or mechanical switches have been used as input devices for electronic apparatus, such as a desk-top electronic calculator. However, since the switching is accomplished by the touching of contacts in these switches, such shortcomings as chattering of the contacts or misperformance of the contacts under mechanical shocks are likely to arise. Moreover, in case a number of sealed reed-contact type switches are used, located side by side, when more than two input keys thereof are operated simultaneously, the sealed reed-contact switches are liable to cause a problem in that the reed-contacts do not recover to their separated positions.

Though non-contact type switching elements, such as Hall-elements, magneto-responsive resistors, etc., are proposed to constitute non-contact type switching devices, these elements not only are very expensive by themselves, but also have poor sensitivities and temperature-characteristics. Accordingly, the use of these elements is not practical.

SUMMARY OF THE INVENTION

Therefore, this invention provides a novel non-contact switching device capable of switching an electronic circuit without mechanical contact or separation of contacts. Another object of this invention is to provide a non-contact switching device capable of stable and reliable switching performance regardless of mechanical shocks or environmental temperature.

This invention is based upon the phenomenon wherein for an inductor comprising a magnetic core of ferro-magnetic or ferri-magnetic substance and at least one coil wound around this core, the B-H curve, namely, the magnetization curve shrinks into a smaller loop while keeping a nearly similar configuration and center position of its hysteresis loop when a permanent magnet nears said core.

BRIEF DESCRIPTION OF THE DRAWINGS

Further objects and advantages will be best understood from the following detailed description when read in conjunction with the accompanying drawings, in which.

DETAILED DESCRIPTION OF THE INVENTION

Figures 1, 2, 3:
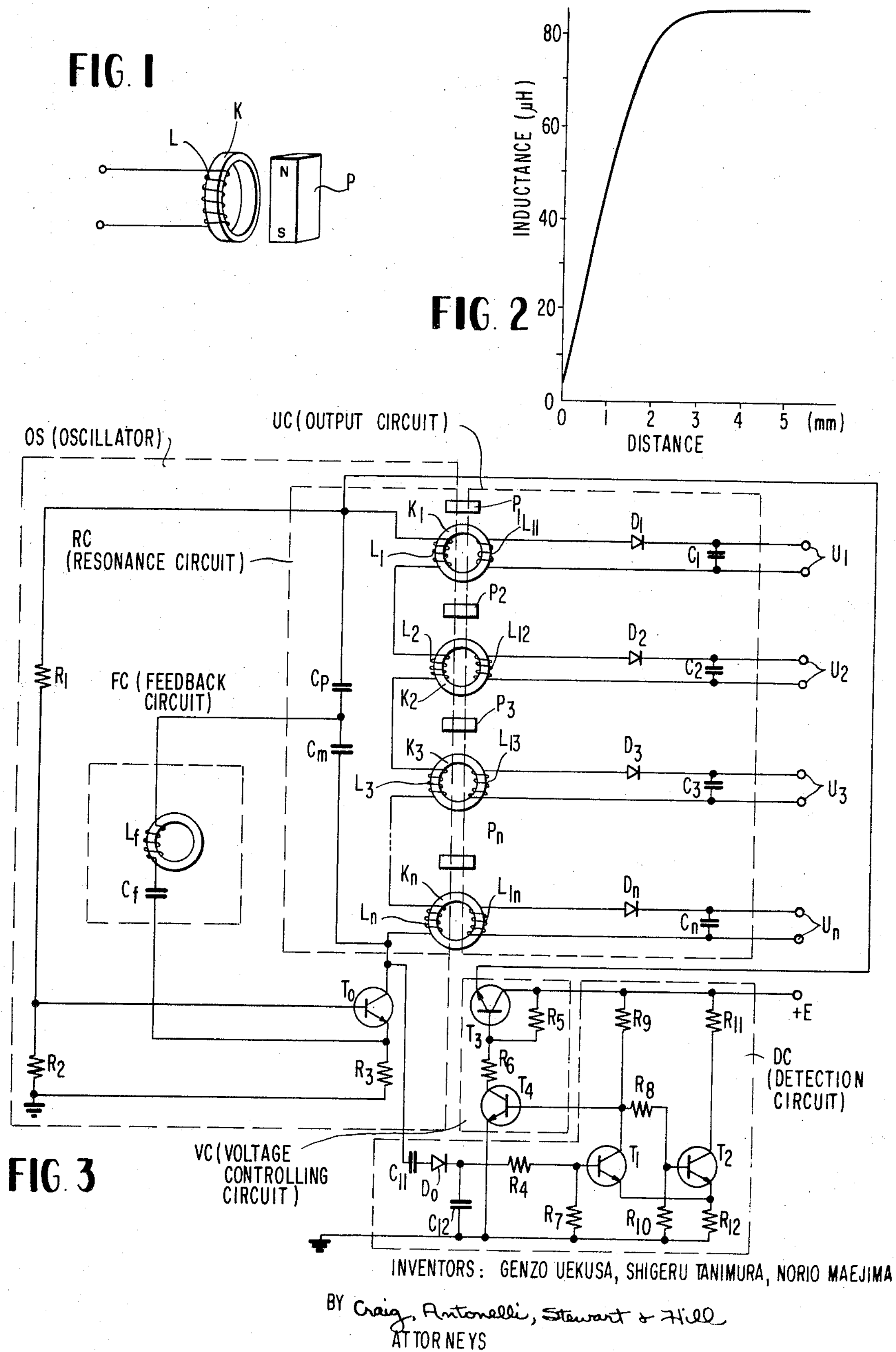
FIG. 1 is a perspective view of an inductor and a movable permanent magnet arranged so as to influence said inductor, which are used in the switching device of the present invention.
FIG. 2 is a diagram indicating the relation between the inductance of the inductor and the magnet-to-core distance.
FIG. 3 is a circuit diagram of the non-contact switching device embodying the present invention.

In FIG. 1, which illustrates an inductor used in the non-contact switching device of the present invention, a coil L is wound around a magnetic core K made of ferromagnetic substance, such as iron, or a ferrimagnetic substance, such as ferrite. A permanent magnet P is movably positioned near the magnetic core K. A magnetic device thus constituted works as a variable inductor. When the permanent magnet P is positioned sufficiently far from the core K, the inductance of the coil L is large. However, when the permanent magnet P nears the core K, so that a considerable part of the magnetic flux of the magnet P strays in the core K, the magnetization curve of the core K shrinks into a smaller loop keeping a nearly similar configuration and center position of its hysteresis loop. As a consequence of the above phenomenon, the inductance of the coil L decreases as the magnet P nears the core K.

FIG. 2 indicates a characteristic of relation between the inductance of the inductor and the magnet-to-core distance, wherein the curve shows a sharp decline to only several micro Henrys ($\mu$H) of inductance as the magnet P moves to within 2 mm from the surface of the core K. The magnetic core K is a ring-shaped ferrite core having:

outer diameter of . . . 10 mm
inner diameter of . . . 6 mm
thickness of . . . 2 mm The coil L is a 30-turn coil wound around the core K. The magnet is shaped in the form of a cylinder of 36 $mm^2$ cross-section and 10 mm long, and has magnetic flux density of 900 Gauss. When the magnet P is far away from the core K, the inductance reaches about 100 $\mu$H; and when the magnet P contacts the core K, the inductance decreases to only 3 $\mu$H. That is to say, by handling the magnet P, the inductance can be decreased to one twentieth of the maximum value. A number of the above-mentioned variable inductors are employed in the switching device embodying the present invention as illustrated in FIG. 3.

The non-contact switching device shown in FIG. 3 consists of an oscillator OS, an output circuit UC, a detection circuit DC and a voltage controlling circuit VC. The oscillator contains a transistor $T_0$, a resonance circuit RC, a feedback circuit FC and resistors $R_1$, $R_2$ and $R_3$. The resonance circuit consists of series-connected capacitors $C_p$ and $C_m$, and series connected inductors $L_1$, $L_2$, . . . $L_n$ which are constituted to have movable permanent magnets $P_1$, $P_2$, . . . $P_n$, respectively, as described in connection with FIG. 1 and FIG. 2. Each of the magnets $P_1$ to $P_n$ is arranged so as to be placed close to each of the cores $K_l$ to $K_n$ in the normal state. The feedback circuit consists of a resonance circuit having an inductor $L_f$ and a capacitor $C_f$. As the inductor $L_f$, an inductor such as explained with reference to FIG. 1 having similar temperature characteristics thereto may be employed in order to compensate the temperature dependency of the output. The output circuit UC consists of secondary coils $L_{11}$ to $L_{1n}$ wound around respective cores $K_1$ to $K_n$, diodes $D_1$ to $D_n$ connected in series to respective secondary coils $L_{11}$ to $L_{1n}$, and smoothing capacitors $C_1$ to $C_n$ connected across respective output terminals $U_1$ to $U_n$ to which both terminals of respective secondary coils $L_{11}$ to $L_{1n}$ are connected through said respective diodes $D_l$ to $D_n$. Said detection circuit DC is for detection of changes of oscillation, and comprises a diode $D_0$ for rectifying the output signal of the oscillator OS, a smoothing circuit consisting of a resistor $R_4$ and a capacitor $C_{12}$, a Schmidt circuit for detecting the rectified and smoothed output, consisting of two transistors $T_1$ and $T_2$ and resistors $R_7$ to $R_{12}$. The voltage controlling circuit VC is connected between the D.C. power supply terminal +E and the oscillator OS for controlling the supply voltage to said oscillator OS in response to the output signal of the detection circuit DC, and consists of transistors $T_3$ and $T_4$ and resistors $R_5$ and $R_6$.

The operation of the above-mentioned non-contact switching device is as follows:

When one of the magnets, for instance $P_2$, is pushed down so as to move away from the core $K_2$, only the coil $L_2$ comes to have a certain inductance, for instance, several tens of micro Henrys, while all of the other inductors have small inductances in the range of several micro Henrys. As a result, the inductance of the series-connected inductors $L_1$ to $L_n$ reaches a certain value, and accordingly, the resonant frequency of the resonance circuit RC becomes a predetermined frequency and the oscillator OS starts to oscillate. By selecting the resonant frequency of the feedback circuit FC to correspond to that of the resonance circuit RC, in which one permanent magnet is moved away from the core, the rise-up of the oscillation with the movement of the magnet is made steeper. With the rising of the oscillation in the oscillator OS, the oscillated signal is rectified by the diode $D_0$ and smoothed by the smoothing circuit $C_{12} - R_4$, and causes the Schmidt circuit of the detection circuit DC to control the voltage controlling circuit VC so as to raise the supply voltage to the oscillator OS. Accordingly, once one of the permanent magnets is moved away from the core, oscillation starts, and the oscillator is simultaneously controlled to increase its oscillation energy. According to such positive feedback performance by means of the detection circuit DC and the voltage controlling circuit VC, the rise-up characteristic of the oscillation can be made very steep irrespective of the speed of movement of the magnet away from the core. When the oscillator OS is oscillating during the movement of the magnet $P_2$, a secondary voltage is induced in the secondary coil $L_{12}$, caused by the primary current in the coil $L_2$. The secondary voltage is rectified by the diode $D_2$ and smoothed by the capacitor $C_2$ to generate a D.C. output signal to the output terminals $U_2$. In the other inductors, since each permanent magnet is positioned close to the respective core, the inductance is very low, and no secondary voltage is induced in each secondary coil. Accordingly, virtually no output signal appears in other terminals.

As a variation, the oscillator OS may be so constituted as to change oscillation frequency when one of the permanent magnets is moved out from the core. In this arrangement, the detection circuit DC should be constituted to detect a change of the oscillation frequency to apply a control signal to the voltage controlling circuit when the frequency is changed to a preset frequency. A known frequency discriminator may be employed as such a detection circuit. With the use of such a detection circuit, the oscillation amplitude of the oscillator OS can be increased upon change of the oscillation frequency to the preset frequency. Therefore, a sharp rise-up of the output signal to the selected one of the output terminals $U_1$ to $U_n$ is obtainable.

Instead of connecting the secondary coils $L_{11}$ to $L_{1n}$, through the diodes $D_1$ to $D_n$, to the output terminals $U_1$ to $U_n$, respectively, it is possible to connect both ends of coils $L_1$ to $L_n$ through the diodes $D_1$ to $D_n$ to the output terminals $U_1$ to $U_n$, respectively, omitting secondary coils $L_{11}$ to $L_{1n}$. In the device so connected, the output signal can also be available to the selected pair of the terminals $U_1$ to $U_n$, like the aforementioned example.

As a variation, in the above-mentioned switching device, each inductor may be constituted to have more than two secondary coils.

The above-mentioned devices have an interlocking function wherein no output signal is generated in case more than two magnets move away from their respective core simultaneously by, for instance, a mishandling of keys linked to the permanent magnets. That is to say, when more than two magnets move away from the respective cores, the inductances increase in more than two inductors, making the total inductance twice or more times than when only one magnet moves away from the core. Due to such excessive increase of the inductance in the resonance circuit, the oscillation circuit loses its condition of oscillation. Consequently, the interlocking function to prevent oscillation at inadvertent overlapped operation of the magnets can be obtained.

As a variation, a switching device can be constituted so as to perform an AND operation, by constituting the feedback inductor $L_f$ with an inductor such as illustrated in FIG. 1, with a movable permanent magnet, a magnetic core and a coil wound around it, and by selecting the resonant frequencies of the resonance circuit RC and the feedback circuit FC in a predetermined relation. Namely, by selecting the resonant frequency of the feedback circuit FC with its movable permanent magnet placed apart from the core, the same as with the resonant frequency of the resonance circuit RC with its one permanent magnet placed apart from its core, an AND operation can be performed by moving both magnets of the resonance circuit RC and of the feedback circuit FC away from their cores.

As another variation, a switching device can be constituted so as to perform an "Inhibit" operation, by constituting the feedback circuit FC as a parallel resonance circuit consisting of the parallel connection of a resonance inductor with a movable permanent magnet as illustrated in FIG. 1 and a resonance capacitor, and by selecting the resonance frequency of this feedback circuit FC with its movable permanent magnet moved away from the core, the same as with the resonant frequency of the resonance circuit RC with its one permanent magnet moved away from its core. Namely, inhibition of the oscillation can be obtained when the magnet of the feedback circuit FC is spaced from its core.

As modified embodiments, such non-contact switching devices, in which all of permanent magnets are placed away from respective cores in the normal state, so that one of the magnets is moved to contact its core when a key linked to it is pushed down, may be constituted.

In other modified embodiments, non-contact switching devices may be constituted wherein its oscillator stops its oscillation during a period when either one of permanent magnets moves away from its core, and oscillates during a period when all the permanent magnets are put close to the respective cores by suitably selecting the conditions of oscillation of the oscillator.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A non-contact switching device comprising:
at least one inductor having at least one coil wound around a magnetic path of which at least one part is constituted by a core of magnetic substance;
at least one movable permanent magnet which is magnetically coupled to said magnetic path in a manner to change it magnetic influence on said magnetic circuit in accordance with the gap between said magnet and the core; and
an oscillator which includes said inductor as part of its resonance circuit so that its state of oscillation is changed in response to the change of influence of said permanent magnet on the core of the inductor.

2. A non-contact switching device as defined in claim 1, wherein said oscillator changes its amplitude of oscillation in response to the change of influence of said magnet on the core of the inductor.

3. A non-contact switching device as defined in claim 1, wherein said oscillator changes its frequency of oscillation in response to the change of influence of said magnet on the core of the inductor.

4. A non-contact switching device as defined in claim 1, wherein said inductor further comprises a secondary coil in which an output voltage is induced.

5. A non-contact switching device as defined in claim 1, wherein said oscillator contains another resonance inductor in its feedback circuit which has the same construction as said one inductor.

6. A non-contact switching device as defined in claim 1, which further comprises a detection circuit and a voltage controlling circuit, wherein said detection circuit detects the change of state of oscillation of the oscillator and causes said voltage-controlling circuit to change the supply voltage to the oscillator.

7. A non-contact switching device as defined in claim 1, wherein more than two of said coils of the inductors are connected in series constituting the inductor of the resonance circuit.

8. A non-contact switching device as defined in claim 2, wherein more than two of said coils of the inductors are connected in series constituting the inductor of the resonance circuit.

9. A non-contact switching device as defined in claim 3, wherein more than two of said coils of the inductors are connected in series constituting the inductor of the resonance circuit.

10. A non-contact switching device as defined in claim 4, wherein more than two of said coils of the inductors are connected in series constituting the inductor of the resonance circuit.

11. A non-contact switching device as defined in claim 5, wherein more than two of said coils of the inductors are connected in series constituting the inductor of the resonance circuit.

12. A non-contact switching device as defined in claim 6, wherein more than two of said coils of the inductors are connected in series constituting the inductor of the resonance circuit.

13. A non-contact switching device as defined in claim 1, wherein said permanent magnet is arranged to rest in close contact to said core in the normal state.

14. A non-contact switching device as defined in claim 4, wherein said permanent magnet is arranged to rest in close contact to said core in the normal state.

* * * * *